United States Patent
Liu et al.

(10) Patent No.: US 10,057,522 B2
(45) Date of Patent: Aug. 21, 2018

(54) IMAGE SENSOR AND METHOD AND APPARATUS FOR REMOVING SUNSPOT OF THE SAME

(71) Applicant: BYD COMPANY LIMITED, Shenzhen, Guangdong (CN)

(72) Inventors: Kun Liu, Guangdong (CN); Xianqing Guo, Guangdong (CN); Jingjun Fu, Guangdong (CN)

(73) Assignee: BYD Company Limited (CN)

( * ) Notice: Subject to any disclaimer, the term of this patent is extended or adjusted under 35 U.S.C. 154(b) by 0 days.

(21) Appl. No.: 15/312,143

(22) PCT Filed: Aug. 3, 2015

(86) PCT No.: PCT/CN2015/085939
§ 371 (c)(1),
(2) Date: Nov. 17, 2016

(87) PCT Pub. No.: WO2016/023429
PCT Pub. Date: Feb. 18, 2016

(65) Prior Publication Data
US 2017/0094211 A1    Mar. 30, 2017

(30) Foreign Application Priority Data
Aug. 12, 2014    (CN) .......................... 2014 1 0394941

(51) Int. Cl.
*H04N 5/374*    (2011.01)
*H04N 5/351*    (2011.01)

(52) U.S. Cl.
CPC ............. *H04N 5/374* (2013.01); *H04N 5/351* (2013.01)

(58) Field of Classification Search
CPC .............................. H04N 5/374; H04N 5/351
See application file for complete search history.

(56) References Cited

U.S. PATENT DOCUMENTS

| | | | |
|---|---|---|---|
| 2006/0170794 A1 | 8/2006 | Higuchi et al. | |
| 2006/0170803 A1 | 8/2006 | Lim | |

(Continued)

FOREIGN PATENT DOCUMENTS

| | | | |
|---|---|---|---|
| CN | 101753800 A | 6/2010 | |
| CN | 102300058 A | 12/2011 | |

(Continued)

OTHER PUBLICATIONS

Written Opinion and International Search Report from PCT/CN2015/085939 dated Oct. 23, 2015.

*Primary Examiner* — Gevell Selby
(74) *Attorney, Agent, or Firm* — Calfee, Halter & Griswold LLP (57) ABSTRACT

A method for removing a sunspot of an image sensor, an apparatus for removing a sunspot of an image sensor and an image sensor are provided. The method includes: obtaining reset sampling signal values of pixel units in a pixel array of the image sensor; for each of the reset sampling signal values, determining whether the reset sampling signal value is less than a predetermined sampling signal threshold, and generating a comparing signal when the reset sampling signal value is less than the predetermined sampling signal threshold; generating location information of the pixel unit corresponding to the reset sampling signal value according to the comparing signal; and replacing the reset sampling signal value corresponding to the location information with a maximum brightness value.

13 Claims, 7 Drawing Sheets

(56) References Cited

U.S. PATENT DOCUMENTS

| | | |
|---|---|---|
| 2007/0080376 A1 | 4/2007 | Adachi et al. |
| 2012/0008032 A1 | 1/2012 | Kurihara et al. |
| 2013/0107331 A1 | 5/2013 | Mori |
| 2014/0070974 A1* | 3/2014 | Park .................. H03K 5/08 341/155 |
| 2014/0240568 A1* | 8/2014 | Yamagata ............ H04N 5/378 348/308 |

FOREIGN PATENT DOCUMENTS

| | | |
|---|---|---|
| CN | 103684460 A | 3/2014 |
| JP | 2011160046 A | 8/2011 |
| WO | 2007066893 A1 | 6/2007 |

* cited by examiner

IMAGE SENSOR AND METHOD AND APPARATUS FOR REMOVING SUNSPOT OF THE SAME

CROSS-REFERENCE TO RELATED APPLICATION

This application is a national phase of International Application No. PCT/CN2015/085939 filed Aug. 3, 2015, which claims priority and benefits of Chinese Patent Application No. 201410394941.8, filed with State Intellectual Property Office, P.R.C. on Aug. 12, 2014, the entire contents of which are incorporated herein by reference.

FIELD

Embodiments of the present disclosure generally relate to an image processing filed, and more particularly, to a method for removing a sunspot of an image sensor and an apparatus for removing a sunspot of an image sensor and an image sensor.

BACKGROUND

Nowadays, a complementary metal oxide semiconductor image sensor (CMOS image sensor for short) mainly includes an analog signal processing module and a digital signal processing module. Specifically, the CMOS image sensor includes pixel units, a control circuit, an analog front-end processing circuit, an A/D converter, an image signal processing circuit and a related storage unit, etc. With the development of the CMOS image sensor, the research on the CMOS image sensor is more and more in-depth, and the performance of the CMOS image sensor is significantly improved. However, due to an process structure of the CMOS image sensor and the CMOS image sensor itself, when the light is too bright, a voltage of the reset sampling signal of the image sensor reduces, and when the light brightness is larger than a predetermined value, the voltage of the reset sampling signal of the image sensor reduces more quickly with the increment of the light brightness, such that a sunspot occurs for the image sensor when the light brightness is larger. For example, when taking a photo towards the sun, a certain range of sunspots occurs in the photo.

In the related art, there are two ways for removing the sunspot. In the first way, the sunspot is removed in a digital way: first, it is determined whether a sunspot phenomenon occurs, and when it is determined that the sunspot phenomenon occurs, a compensation is performed on the sunspot area, that is, a brightness value in the sunspot area is adjusted to be the same with the that around the sunspot area. In the second way, the sunspot is removed in an analog way: first, it is determined whether the sunspot phenomenon occurs, that is, it is determined whether a difference between a reset sampling level and a reference level is larger than a predetermined value, and when it is determined that the sunspot phenomenon occurs (the difference is larger than the predetermined value), the reset sampling level is replaced with a fixed level generated by a fixed level generation circuit, so as to correct the sunspot phenomenon caused by the reduction of the reset sampling level.

The ways for removing the sunspot in the related art at least have following disadvantages.

1. With the digital way, it is easy to misjudge the sunspot, that is, the judgment about whether there is the sunspot phenomenon is inaccurate. For example, a black object may be misjudged to be the sunspot, since the form of the black object is similar to the sunspot. Moreover, the sunspot may not be judged accurately, for example, the sunspot may be considered as the black object.

2. With the analog way which replaces the reset sampling level with the fixed level generated by the fixed level generation circuit, although no misjudgment will be made, too much noise will be caused to the sampling circuit.

SUMMARY

Embodiments of the present disclosure seek to solve at least one of the problems existing in the related art to at least some extent.

Embodiments of a first aspect of the present disclosure provide a method for removing a sunspot of an image sensor, and the method includes: obtaining reset sampling signal values of pixel units in a pixel array of the image sensor; for each of the reset sampling signal values, determining whether the reset sampling signal value is less than a predetermined sampling signal threshold, and generating a comparing signal when the reset sampling signal values is less than the predetermined sampling signal threshold; generating location information of the pixel unit corresponding to the reset sampling signal value less than the predetermined sampling signal threshold according to the comparing signal; and replacing the reset sampling signal value of the pixel unit with a maximum image brightness value.

With the method for removing the sunspot of the image sensor according to embodiments of the present disclosure, by obtaining the reset sampling signal value of the pixel unit, comparing the reset sampling signal value with the predetermined sampling signal threshold, generating location information of the pixel unit when the reset sampling signal value is less than the predetermined sampling signal threshold, and replacing the reset sampling signal value of the pixel unit with the maximum image brightness value, the sunspot of the pixel unit is removed. Moreover, with the method for removing the sunspot of the image sensor, all the sunspots can be removed accurately without using the fixed level value as the reset sampling signal value, thus effectively reducing the noise of the signal chain.

Embodiments of a second aspect of the present disclosure provide an apparatus for removing a sunspot of an image sensor, and the apparatus includes: an obtaining module, configured to obtain a reset sampling signal values of each pixel unit in a pixel array of the image sensor from an output voltage signal of the pixel unit; a determining module, connected with the obtaining module, and for each reset sampling signal value, the determining module being configured to determine whether the reset sampling signal value is less than a predetermined sampling signal threshold, and to generate a comparing signal when the reset sampling signal value is less than the predetermined sampling signal threshold; a generating module, connected with the determining module, and configured to generate location information of the pixel unit corresponding to the reset sampling signal value according to the comparing signal; and a processing module, connected with the determining module and the generating module respectively, and configured to replace the reset sampling signal value corresponding to the location information with a maximum image brightness value.

With the apparatus for removing the sunspot of the image sensor according to embodiments of the present disclosure, after obtaining reset sampling signal values of pixel units in the pixel array of the image sensor by the obtaining module, the determining module compares each of the reset sampling signal values with the predetermined sampling signal threshold, the generating module generates location information of the reset sampling signal value when the reset sampling signal value is less than the predetermined sampling signal threshold, and the processing module replaces the reset sampling signal value corresponding to the location information with the maximum image brightness value, and thus the sunspot of the pixel unit corresponding to the location information is removed. Moreover, with the apparatus for removing the sunspot of the image sensor, all the sunspots can be removed accurately without using the fixed level value as the reset sampling signal value, thus effectively reducing the noise of the signal chain.

Embodiments of a third aspect of the present disclosure provide an image sensor, and the image sensor includes: the above apparatus for removing a sunspot of an image sensor.

With the image sensor according to embodiments of the present disclosure, by using the apparatus for removing the sunspot of the image sensor to remove all the sunspots in each row and each column pixel unit without using the fixed level value as the reset sampling signal value, thus effectively reducing the noise of the signal chain.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connections or mechanical connections, inner communications between two elements, direct connections or indirect connections through intervening structures, which can be understood by those skilled in the art according to specific situations.

With reference to the following descriptions and drawings, these and other aspects of embodiments of the present disclosure will become apparent. In the descriptions and drawings, some particular embodiments are described in order to show the principles of embodiments according to the present disclosure, however, it should be appreciated that the scope of embodiments according to the present disclosure is not limited herein. On the contrary, changes, alternatives, and modifications can be made in the embodiments without departing from spirit, principles and scope of the attached claims.

In the following, a method for removing a sunspot of an image sensor, an apparatus for removing a sunspot of an image sensor and an image sensor are described in detail with reference to drawings.

First, a reason for the sunspot phenomenon in the pixel unit of the image sensor is described in detail with reference to drawings.

Figure 1:
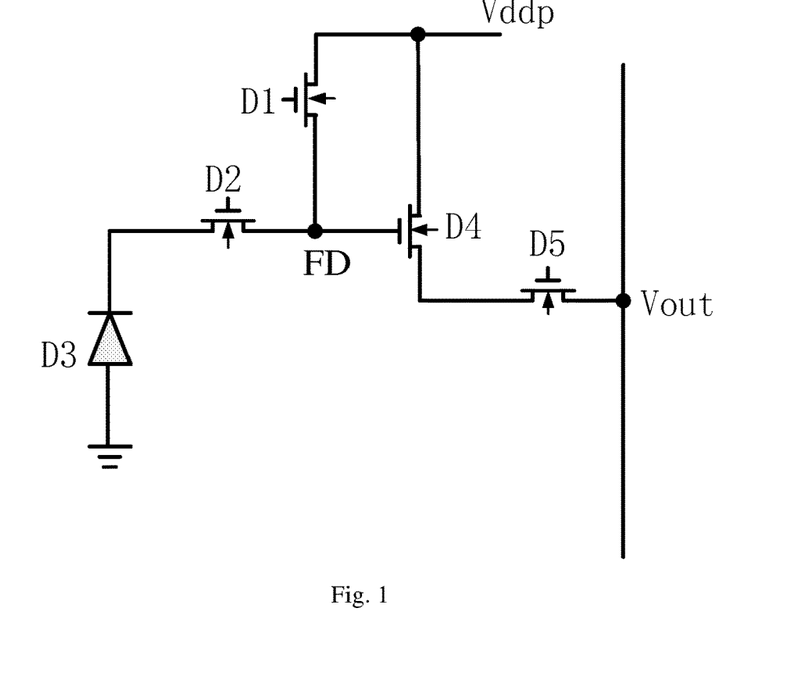
FIG. 1 is a schematic diagram of a pixel unit of a CMOS image sensor according to an embodiment of the present disclosure.

FIG. 1 is a schematic diagram of a pixel unit of a CMOS image sensor according to an embodiment of the present disclosure, in which D1 is a reset transistor, D2 is a transmission transistor, D3 is a photodiode, D4 is a source follower transistor, D5 is a row gate transistor, FD is a floating diffusion node, Vout is an output terminal, and a voltage at the floating diffusion node FD is proportional to the voltage at the output terminal Vout.

Figure 2:
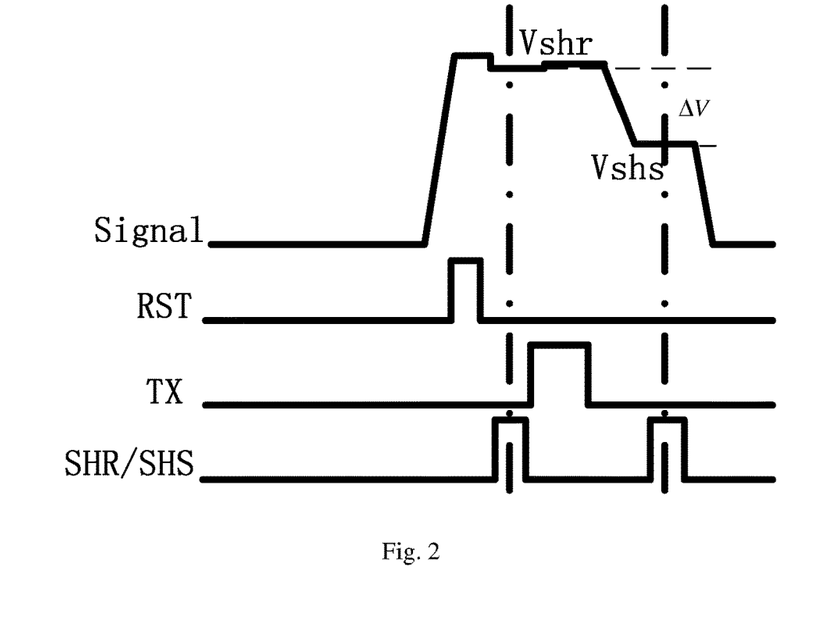
FIG. 2 is a schematic diagram illustrating waveforms of a control sequence and an output voltage signal for a pixel unit of an image sensor under normal light according to an embodiment of the present disclosure.
Figure 3:
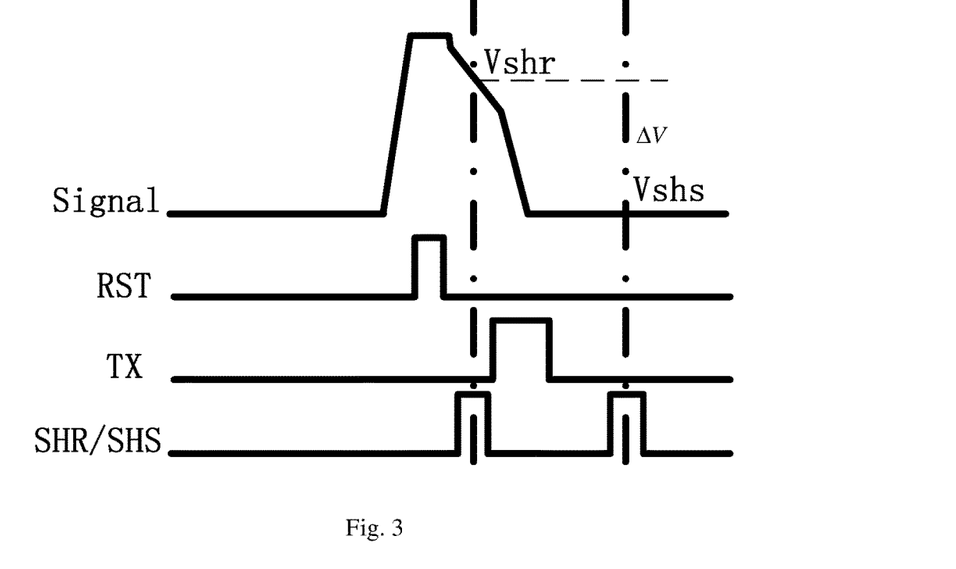
FIG. 3 is a schematic diagram illustrating waveforms of a control sequence and an output voltage signal for a pixel unit of an image sensor under strong light according to an embodiment of the present disclosure.

FIG. 2 is a schematic diagram illustrating waveforms of a control sequence and an output voltage signal for a pixel unit of an image sensor under normal light according to an embodiment of the present disclosure, and FIG. 3 is a schematic diagram illustrating waveforms of a control sequence and an output voltage signal for a pixel unit of an image sensor under strong light according to an embodiment of the present disclosure, in which RST is the control sequence for the reset transistor D1, TX is the control sequence for the transmission transistor D2, SHR/SHS is a sampling sequence of reset signals/a sampling sequence of photoelectron signals, Signal is the output voltage signal from the output terminal Vout. Specifically, when the control sequence RST is at a high level, the reset transistor D1 is turned on, and a reset signal is output from the reset transistor D1 to the output terminal Vout. When the sampling sequence of reset signals SHR is at the high level, the reset signal at the output terminal Vout is sampled for obtaining a reset sampling signal value Vshr. When the control sequence TX is at the high level, the transmission transistor D2 is turned on, and the photoelectron signal of the photodiode D3 is output from the transmission transistor D2 to the output terminal Vout. When the sampling sequence of photoelectron signals SHS is at the high level, the photoelectron signal at the output terminal Vout is sampled for obtaining a photoelectron sampling signal value Vshs. As shown in FIG. 2, a difference ΔV between the reset sampling signal value Vshr and the photoelectron sampling signal value Vshs is corresponding to an image signal, and the larger the photoelectron signal is (the larger the light brightness is), the larger the difference ΔV between the reset sampling signal value Vshr and the photoelectron sampling signal value Vshs is. However, as shown in FIG. 3, when the light brightness is too large, the voltage at the floating diffusion node FD and the voltage at the output terminal Vout will decrease quickly after resetting, and meanwhile the reset sampling signal value Vshr decreases. Due to this, the image signal (i.e. the difference ΔV between the reset sampling signal value Vshr and the photoelectron sampling signal value Vshs) decreases, and thus the sunspot phenomenon occurs. It should be noted that, ideally, the reset sampling signal value Vshr does not decrease.

In the following, a method for removing a sunspot of an image sensor is described in detail with reference to drawings.

Figure 4:
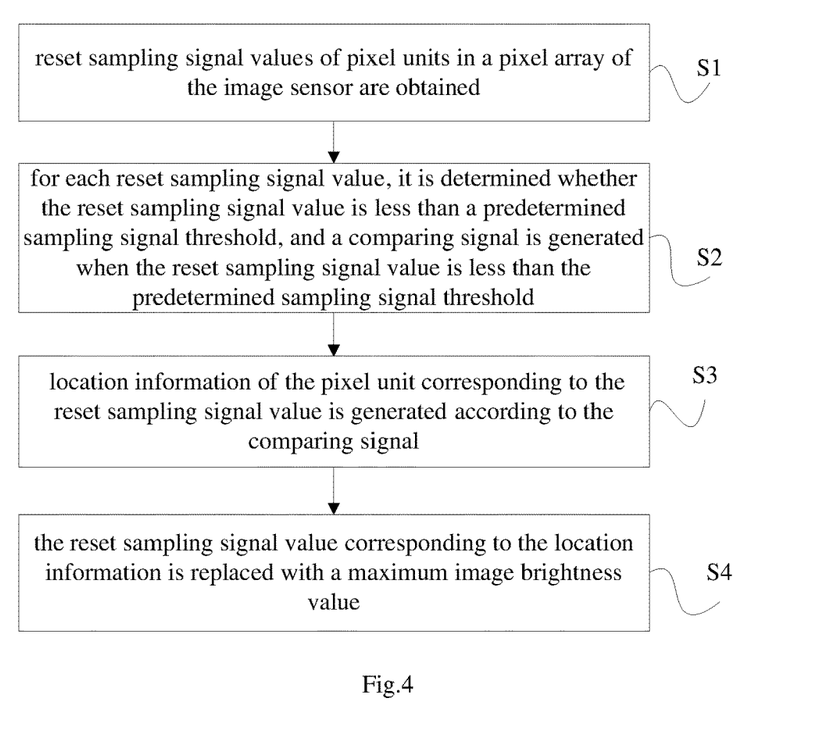
FIG. 4 is a flow chart of a method for removing a sunspot of an image sensor according to an embodiment of the present disclosure.

FIG. 4 is a flow chart of a method for removing a sunspot of an image sensor according to an embodiment of the present disclosure. As shown in FIG. 4, the method includes following steps.

At step S1, reset sampling signal values of pixel units in a pixel array of the image sensor are obtained.

In an embodiment, the image sensor may be a complementary metal oxide semiconductor CMOS image sensor. When reset sampling signal values of all the pixel units in the pixel array of the image sensor are obtained, step S2 is executed.

At step S2, for each of the reset sampling signal values, it is determined whether the reset sampling signal value is less than a predetermined sampling signal threshold, and a comparing signal is generated when the reset sampling signal value is less than the predetermined sampling signal threshold.

When the sunspot occurs, the reset sampling signal value of the pixel unit is less than the sampling signal value in normal condition, and thus it is possible to determine whether the sunspot occurs in the pixel unit by comparing the reset sampling signal value of the pixel unit with the predetermined sampling signal threshold. When the reset sampling signal value of the pixel unit is less than the predetermined sampling signal threshold, it is indicated that the sunspot occurs in the pixel unit, and step S3 is executed.

At step S3, location information of the pixel unit corresponding to the reset sampling signal value less than the predetermined sampling signal threshold is generated according to the comparing signal.

It should be noted that, for each reset sampling signal value less than the predetermined sampling signal threshold, one comparing signal is generated, and in response to each comparing signal, the location information of the pixel unit corresponding to the reset sampling signal value is generated.

At step S4, the reset sampling signal value corresponding to the location information is replaced with a maximum image brightness value.

It should be noted that, for each reset sampling signal value less than the predetermined sampling signal threshold, it is replaced with the maximum image brightness value. Thus, all the sunspots can be removed.

Figure 5:
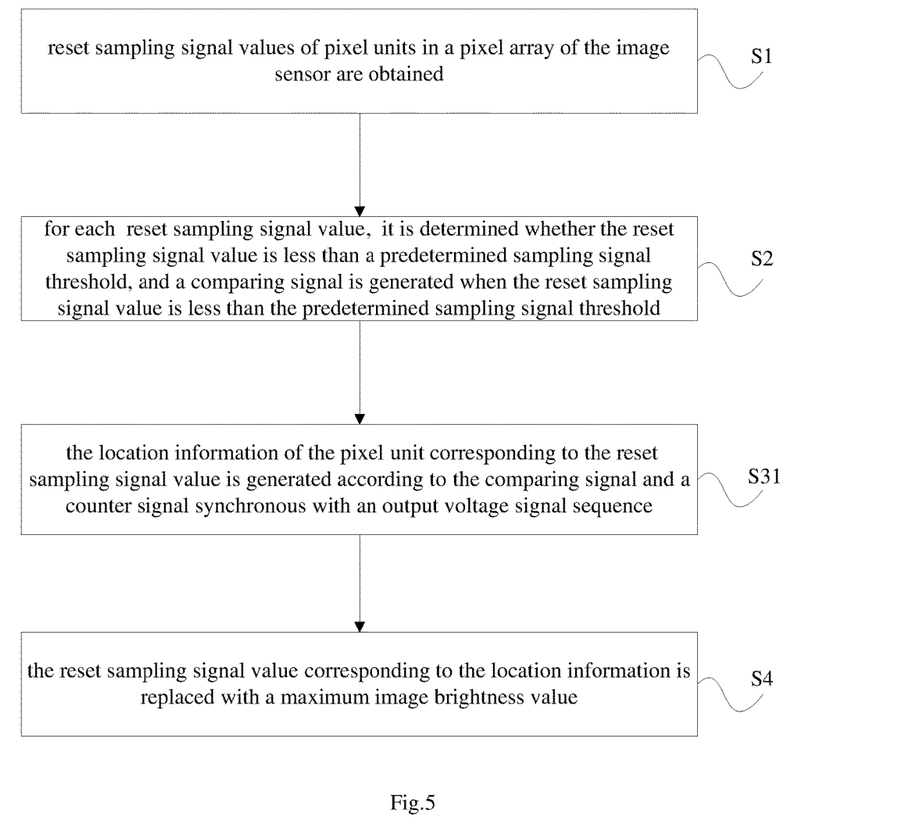
FIG. 5 is a flow chart of a method for removing a sunspot of an image sensor according to another embodiment of the present disclosure.

FIG. 5 is a flow chart of a method for removing a sunspot of an image sensor according to another embodiment of the present disclosure. As shown in FIG. 5, at step 31, the location information of the pixel unit corresponding to the reset sampling signal value less than the predetermined sampling signal threshold is generated according to the comparing signal and a counter signal, in which the counter signal is synchronous with the output voltage signal sequence, the output voltage signal sequence is formed by the output voltage signals of the pixel units, and the reset sampling signal value of each pixel unit is obtained from the output voltage signal of the pixel unit.

Figure 6:
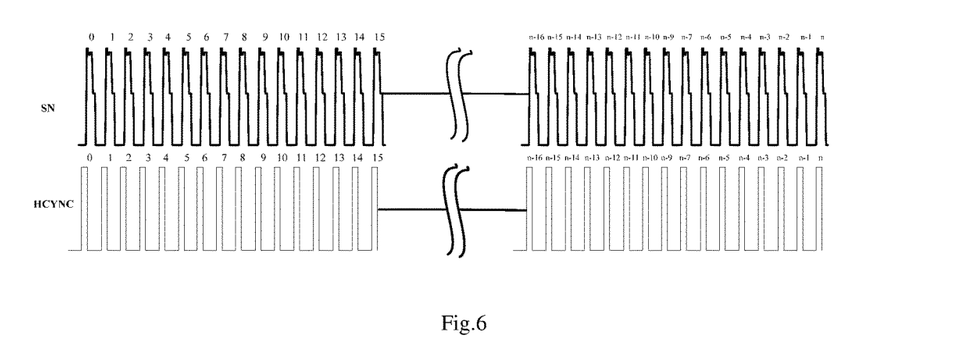
FIG. 6 is a schematic diagram illustrating waveforms of an output voltage signal and a synchronous counter signal for pixel units in one row of a pixel array of an image sensor according to an embodiment of the present disclosure, when no sunspot occurs.
Figure 7:
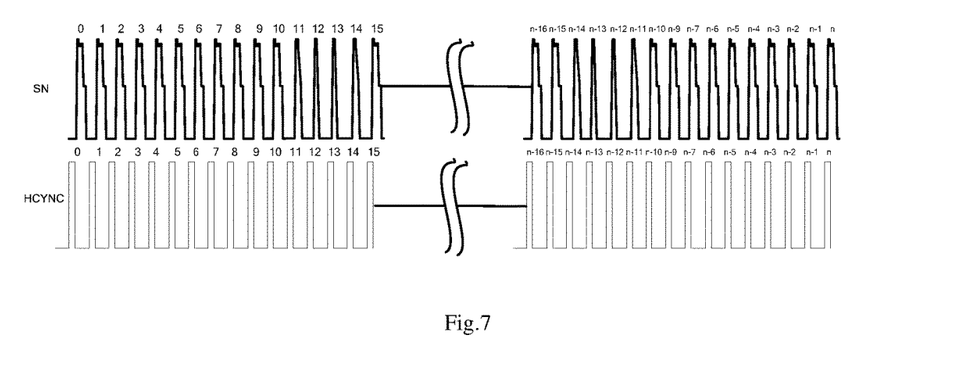
FIG. 7 is a schematic diagram illustrating waveforms of an output voltage signal and a synchronous counter signal for of pixel units in one row of a pixel array of an image sensor according to an embodiment of the present disclosure, in which a sunspot phenomenon occurs.

FIG. 6 is a schematic diagram illustrating waveforms of an output voltage signal sequence and a counter signal for pixel units in one row of a pixel array of an image sensor according to an embodiment of the present disclosure, in which no sunspot occurs, and FIG. 7 is a schematic diagram illustrating waveforms of an output voltage signal sequence and a counter signal for pixel units in one row of a pixel array of an image sensor according to an embodiment of the present disclosure, in which the sunspot occurs. As shown in FIG. 6 and FIG. 7, each counter pulse is synchronous with an output voltage signal, specifically, with an interval between the time sampling the reset sampling signal and the time sampling the photoelectron signal of the pixel unit. More specifically, for a certain pixel unit, a rising edge of the counter pulse corresponding to the pixel unit is at the time sampling the reset sampling signal of the pixel unit and a falling edge of the counter pulse corresponding to the pixel unit is at the time sampling the photoelectron signal of the pixel unit. Further, in an embodiment, a number of counter pulses in the counter signal (for example, the clock signal HCYNC) can be equal to the number of pixel units in one row of the pixel array of the image sensor, such as n+1, where n is an integer and greater than or equal to 0. It should be noted that, in this case, the number of output voltage signals in the output voltage signal sequence SN is equal to the number of pixel units in one row of the pixel array of the image sensor. In other words, in an embodiment of the present disclosure, each row of pixel units in the pixel array may be processed separately.

Figure 8:
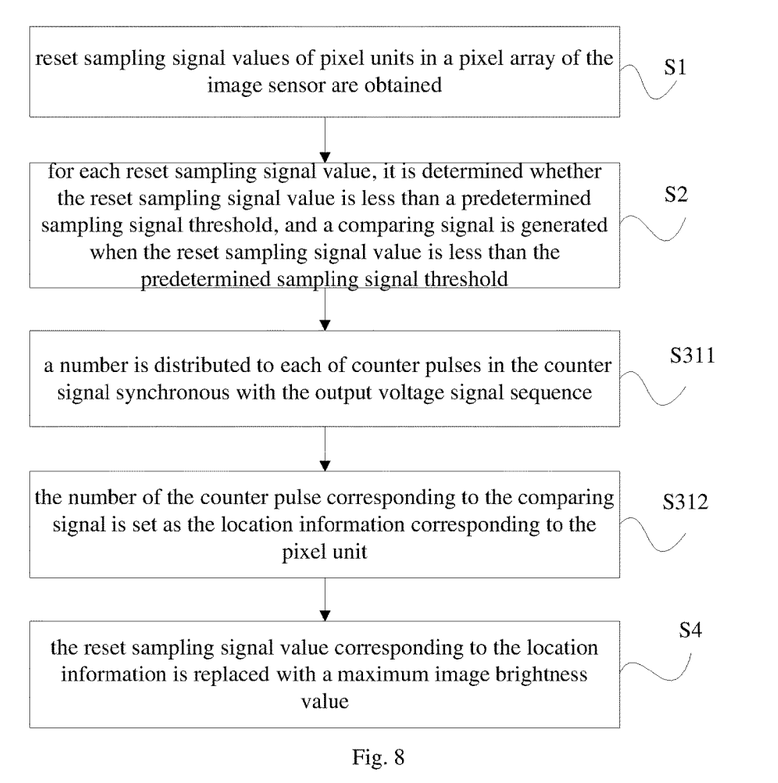
FIG. 8 is a flow chart of a method for removing a sunspot of an image sensor according to yet another embodiment of the present disclosure.

FIG. 8 is a flow chart of a method for removing a sunspot of an image sensor according to yet another embodiment of the present disclosure. As shown in FIG. 8, a number is distributed to each of counter pulses in the counter signal at step 311, and at step 312, the number of the counter pulse corresponding to the comparing signal is set as the location information of the pixel unit corresponding to the reset sampling signal value less than the predetermined sampling signal threshold. Thus, the reset sampling signal value less than the predetermined sampling signal threshold can be replaced with the maximum image brightness value according to the location information of the pixel unit corresponding to the reset sampling signal value (the number of the counter pulse corresponding to the pixel unit).

As shown in FIG. 6, no sunspot occurs in any of the pixel units, and in this case, the reset sampling signal values and the photoelectron sampling signal values of the pixel units are processed normally, that is, none of the reset sampling signal values is replaced with the maximum image brightness value (for example, 255). In another embodiment, as shown in FIG. 7, the sunspot phenomenon occurs in the 11th pixel unit, the 12th pixel unit, the 13th pixel unit, the 14th pixel unit, the (n−14)th pixel unit, the (n−13)th pixel unit, the (n−12)th pixel unit and the (n−11)th pixel unit in the pixel array of the image sensor, and then the location information corresponding to these eight pixel units (the numbers of these eight pixel units) are stored, such that in the image signal processing, the reset sampling signal values of these eight pixel units are replaced with the maximum image brightness value respectively. Thus, all the sunspots can be removed when only the reset sampling signal values less than the predetermined sampling signal threshold are replaced with the maximum image bright value.

Figure 9:
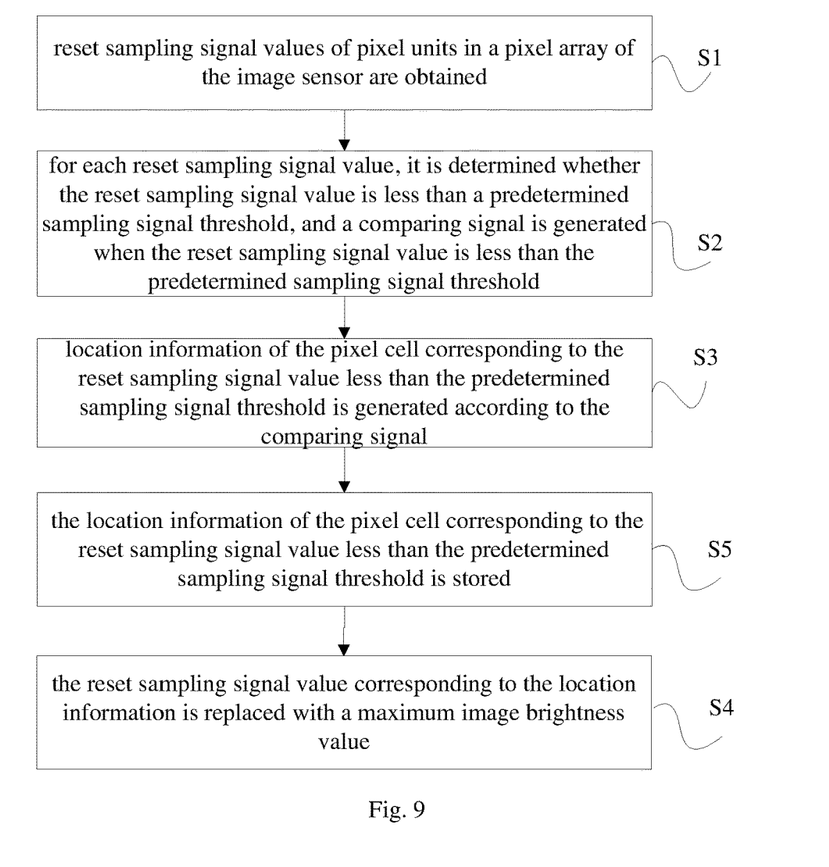
FIG. 9 is a flow chart of a method for removing a sunspot of an image sensor according to still yet another embodiment of the present disclosure.

FIG. 9 is a flow chart of a method for removing a sunspot of an image sensor according to still yet another embodiment of the present disclosure. As shown in FIG. 9, after generating the location information of the pixel unit corresponding to the reset sampling signal value less than the predetermined sampling signal threshold, the location information of the pixel unit is stored, such that in the image signal processing, the reset sampling signal value less than the predetermined sampling signal threshold can be replaced with the maximum image brightness value.

With the method for removing the sunspot of the image sensor according to embodiments of the present disclosure, for each of the pixel units in the pixel array of the image sensor, by obtaining the reset sampling signal value of the pixel unit, comparing the reset sampling signal value with the predetermined sampling signal threshold, generating location information of the pixel unit when the reset sampling signal value is less than the predetermined sampling signal threshold, and replacing the reset sampling signal value of the pixel unit with the maximum image brightness value, the sunspot of the pixel unit can be removed. Moreover, with the method for removing the sunspot of the image sensor, all the sunspots can be removed accurately without using the fixed level value as the reset sampling signal value, thus effectively reducing the noise of the signal chain.

In the following, an apparatus for removing a sunspot of an image sensor is described in detail with reference to drawings.

Figure 10:
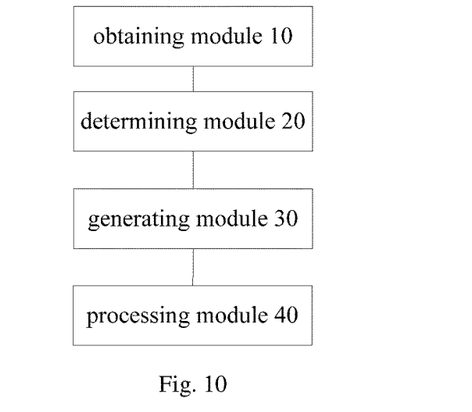
FIG. 10 is a block diagram of an apparatus for removing a sunspot of an image sensor according to an embodiment of the present disclosure.

FIG. 10 is a block diagram of an apparatus for removing a sunspot of an image sensor according to an embodiment of the present disclosure. As shown in FIG. 10, the apparatus includes an obtaining module 10, a determining module 20, a generating module 30 and a processing module 40.

The obtaining module 10 is configured to obtain reset sampling signal values of pixel units in the pixel array of the image sensor. The determining module 20 is connected with the obtaining module 10, and for each of the reset sampling signal values, the determining module 20 is configured to compare the reset sampling signal value with a predetermined sampling signal threshold and to generate a comparing signal when the reset sampling signal values is less than the predetermined sampling signal threshold. For example, the determining module 20 may be a comparator. The generating module 30 is connected with the determining module 20, and configured to generate location information of the pixel unit corresponding to the reset sampling signal value according to the comparing signal. The processing module 40 is connected with the determining module 20 and the generating module 30 respectively, and configured to replace the reset sampling signal value corresponding to the location information with a maximum image brightness value. For example, the processing module 40 may be an image signal processor.

In an embodiment, the image sensor may be a complementary metal oxide semiconductor CMOS image sensor. It should be noted that, when the sunspot occurs in the pixel unit, the reset sampling signal value of the pixel unit is less than the sampling signal value in the normal condition, and thus it is possible to determine whether the sunspot occurs in the pixel unit by comparing the reset sampling signal value of the pixel unit with the predetermined sampling signal threshold. When the reset sampling signal value of the pixel unit is less than the predetermined sampling signal threshold, it is indicated that the sunspot occurs in the pixel unit.

In an embodiment, the generating module 30 is configured to generate the location information of the pixel unit corresponding to the reset sampling signal value according to the comparing signal and a counter signal synchronous with an output voltage signal sequence, in which the output voltage signal sequence is formed by the output voltage signals of the pixel units, and the reset sampling signal value of each pixel unit is obtained from the output voltage signal of the pixel unit. Further, in an embodiment, the number of counter pulses in the counter signal can be equal to the number of the pixel units in one row of the pixel array of the image sensor, such as n+1, where n is an integer and greater than or equal to 0. It should be noted that, in this case, the number of output voltage signals in the output voltage signal sequence is equal to the number of the pixel units in one row of the pixel array of the image sensor.

Figure 11:
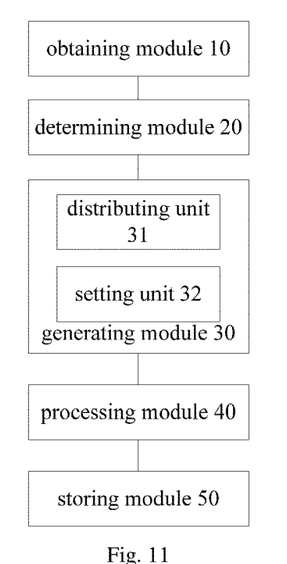
FIG. 11 is a block diagram of an apparatus for removing a sunspot of an image sensor according to another embodiment of the present disclosure.

FIG. 11 is a block diagram of an apparatus for removing a sunspot of an image sensor according to another embodiment of the present disclosure. As shown in FIG. 11, the generating module 30 includes a distributing unit 31 and a setting unit 32. The distributing unit 31 is configured to distribute a number to each of the counter pulses in the counter signal. The setting unit 32 is connected with distributing unit 31, and configured to set the number of the counter pulse corresponding to the comparing signal as the location information of the pixel unit corresponding to the reset sampling signal value less than the predetermined sampling signal threshold.

In an embodiment, as shown in FIG. 11, the apparatus for removing the sunspot of the image sensor may further include a storing module 50. The storing module 50 is configured to store the location information of the pixel unit corresponding to the reset sampling signal value less than the predetermined sampling signal threshold. The storing module 50 may be a SRAM (Static Random Access Memory).

Furthermore, as shown in FIG. 6, no sunspot occurs in any of the pixel units, and in this case, the processing module 40 processes the reset sampling signal values and the photo-electron sampling signal values of the pixel units normally, that is, the processing module 40 does not replace any of the reset sampling signal values with the maximum image brightness value (for example, 255). In another embodiment, as shown in FIG. 7, the sunspot phenomenon occurs in the 11th pixel unit, the 12th pixel unit, the 13th pixel unit, the 14th pixel unit, the (n−14)th pixel unit, the (n−13)th pixel unit, the (n−12)th pixel unit and the (n−11)th pixel unit in the pixel array of the image sensor, and then the processing module 40 stores the location information corresponding to these eight pixel units (the numbers of these eight pixel units) in the storing module 50, such that in the image signal processing, the processing module 40 replaces the reset sampling signal values of these eight pixel units with the maximum image brightness value respectively. Thus, the processing module 40 just needs to replace the reset sampling signal values less than the predetermined sampling signal threshold with the maximum image brightness value, and then all the sunspots can be removed.

With the apparatus for removing the sunspot of the image sensor according to embodiments of the present disclosure, for each of the pixel units in the pixel array of the image sensor, after the obtaining module obtains the reset sampling signal value of the pixel unit, the determining module compares the reset sampling signal value with the predetermined sampling signal threshold, and when the reset sampling signal value is less than the predetermined sampling signal threshold, the generating module generates the location information of the pixel unit, and the processing module replaces the reset sampling signal value corresponding to the location information with the maximum image brightness value, thus removing the sunspot of the pixel unit corresponding to the location information pixel unit. Moreover, with the apparatus for removing the sunspot of the image sensor, all the sunspots can be removed accurately without using the fixed level value as the reset sampling signal value, thus effectively reducing the noise of the signal chain.

Embodiments of the present disclosure also provide an image sensor.

Figure 12:
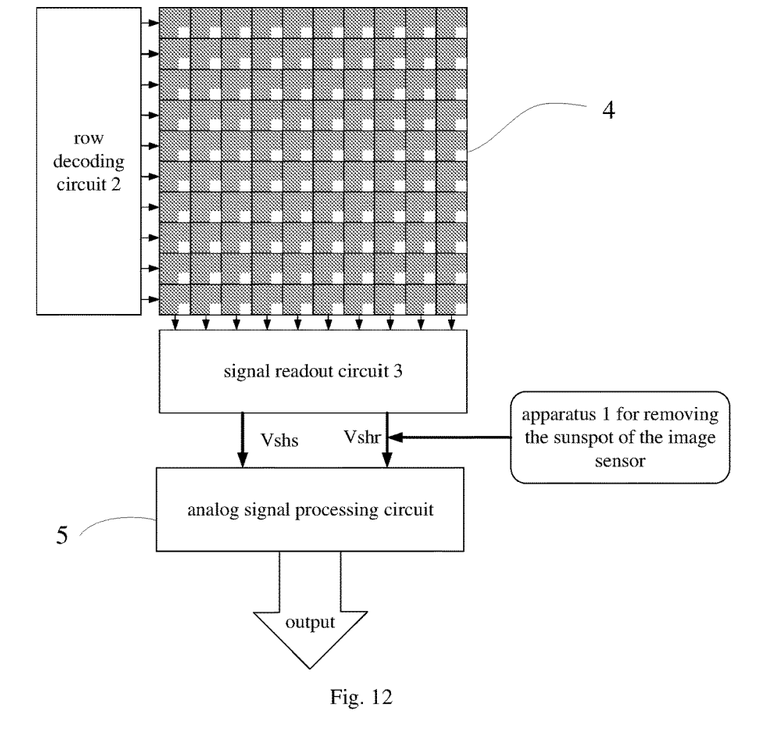
FIG. 12 is a schematic diagram of an image sensor according to an embodiment of the present disclosure.
Figure 13:
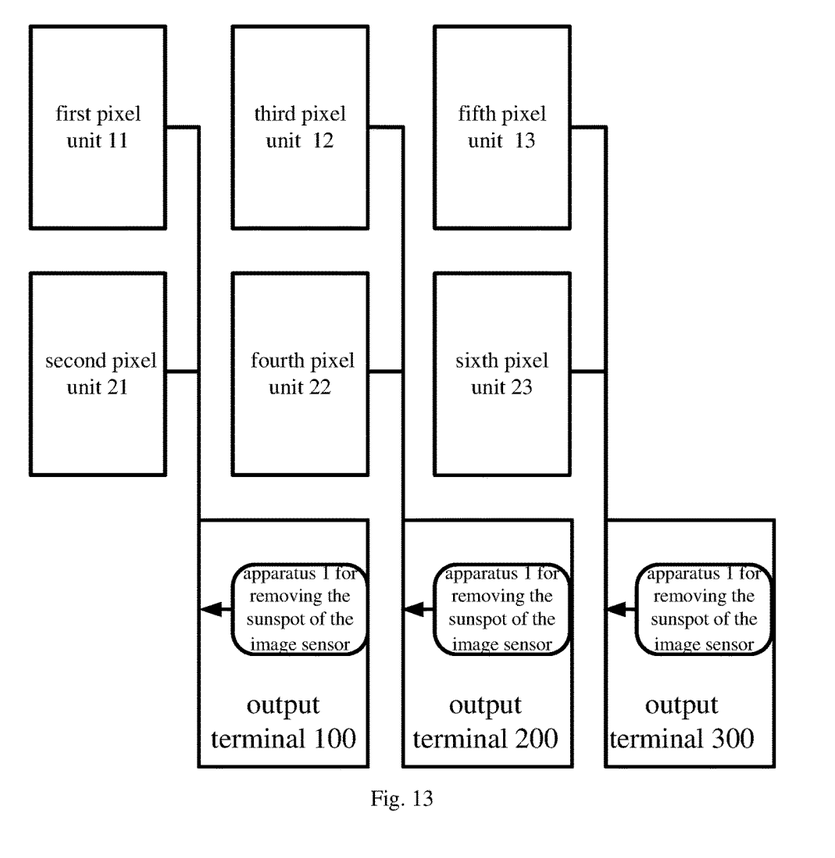
FIG. 13 is a schematic diagram of an image sensor according to another embodiment of the present disclosure.

FIG. 12 is a schematic diagram of an image sensor according to an embodiment of the present disclosure. As shown in FIG. 12, the image sensor includes the apparatus 1 for removing the sunspot of the image sensor as described above. The image sensor also includes a row decoding circuit 2, a signal readout circuit 3, a pixel array 4 and an analog signal processing circuit 5, which are well known by those skilled in the art and thus will not be elaborated herein. The image sensor may be a CMOS image sensor. FIG. 13 is a schematic diagram of an image sensor according to another embodiment of the present disclosure. As shown in FIG. 13, at the output terminal of each column, the apparatus 1 for removing the sunspot of the image sensor is arranged for removing the sunspot in the pixel units in the column. Specifically, as shown in FIG. 13, a first pixel unit 11 and a second pixel unit 21 are in a first column of the pixel array 4, a third pixel unit 12 and a fourth pixel unit 22 are in a second column of the pixel array 4, a fifth pixel unit 13 and a sixth pixel unit 23 are in a third column of the pixel array 4. The pixel units in the same column use an identical signal readout circuit 3 and an identical apparatus for removing the sunspot. For example, if the sunspot occurs in the third pixel unit 12, and no sunspot occurs in the first pixel unit 11, the second pixel unit 21, the fourth pixel unit 22, the fifth pixel unit 13 and the sixth pixel unit 23 around the third pixel unit 12, then in later processing, the reset sampling signal values of the first pixel unit 11, the second pixel unit 21, the fourth pixel unit 22, the fifth pixel unit 13 and the sixth pixel unit 23 are output normally. However, for the reset sampling signal value of the third pixel unit 12, when the apparatus 1 for removing the sunspot of the image sensor obtains the reset sampling signal value of the third pixel unit 12 from the signal readout circuit, and compares it with the predetermined sampling signal threshold, the apparatus 1 determines that the sunspot occurs in the third pixel unit 12. Then, the processing module 40 in the apparatus 1 stores the location information corresponding to the third pixel unit 12 in the storing module 50, and in the image signal processing, the processing module 40 replaces the reset sampling signal value of the third pixel unit 12 with the maximum image brightness value, and thus the sunspot occurring in the third pixel unit 12 is removed.

With the image sensor according to embodiments of the present disclosure, by using the apparatus for removing the sunspot of the image sensor, remove all the sunspots in each row and each column of the pixel array can be removed without using the fixed level value as the reset sampling signal value, thus effectively reducing the noise of the signal chain.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for removing a sunspot of an image sensor, comprising:
   obtaining reset sampling signal values of pixel units in a pixel array of the image sensor;
   for each of the reset sampling signal values, determining whether the reset sampling signal value is less than a predetermined sampling signal threshold, and generating a comparing signal when the reset sampling signal value is less than the predetermined sampling signal threshold;
   generating location information of the pixel unit corresponding to the reset sampling signal value less than the predetermined sampling signal threshold according to the comparing signal; and
   replacing the reset sampling signal value corresponding to the location information with a maximum image brightness value,
   outputting the replaced values of the pixel units as a part of output values of the image sensor.

2. The method of claim 1, wherein generating location information of the pixel unit corresponding to the reset sampling signal value less than the predetermined sampling signal threshold according to the comparing signal comprises:
   generating the location information of the pixel unit corresponding to the reset sampling signal value less than the predetermined sampling signal threshold according to the comparing signal and a counter signal, in which the counter signal is synchronous with an output voltage signal sequence, the output voltage signal sequence is formed by output voltage signals of the pixel units, and the reset sampling signal value of each pixel unit is obtained from the output voltage signal of the pixel unit.

3. The method of claim 2, wherein generating the location information of the pixel unit corresponding to the reset sampling signal value less than the predetermined sampling signal threshold according to the comparing signal and a counter signal comprises:
   distributing a number to each of counter pulses in the counter signal; and
   setting the number of the counter pulse corresponding to the comparing signal as the location information of the pixel unit corresponding to the reset sampling signal value less than the predetermined sampling signal threshold.

4. The method of claim 2, wherein a number of counter pulses in the counter signal is equal to that of the pixel units in one row of the pixel array.

5. The method of 1, further comprising:
   storing the location information of the pixel unit corresponding to the reset sampling signal value less than the predetermined sampling signal threshold, before replacing the reset sampling signal value of the pixel unit with the maximum image brightness value.

6. The method of claim 1, wherein the image sensor is a complementary metal oxide semiconductor CMOS image sensor.

7. An apparatus for removing a sunspot of an image sensor, comprising:
   an obtaining module, configured to obtain reset sampling signal values of pixel units in a pixel array of the image sensor;
   a determining module, connected with the obtaining module, and for each of the reset sampling signal values, the determining module being configured to determine whether the reset sampling signal value is less than a predetermined sampling signal threshold, and to generate a comparing signal when the reset sampling signal value is less than the predetermined sampling signal threshold;
   a generating module, connected with the determining module, and configured to generate location information of the pixel unit corresponding to the reset sampling signal value less than the predetermined sampling signal threshold according to the comparing signal; and
   a processing module, connected with the determining module and the generating module respectively, and configured to replace the reset sampling signal value corresponding to the location information with a maximum image brightness value.

8. The apparatus of claim 7, wherein the generating module is configured to:
   generate the location information of the pixel unit corresponding to the reset sampling signal value less than the predetermined sampling signal threshold according to the comparing signal and a counter signal, in which the counter signal is synchronous with an output voltage signal sequence, the output voltage signal sequence is formed by output voltage signals of the pixel units, and the reset sampling signal value of each pixel unit is obtained from the output voltage signal of the pixel unit.

9. The apparatus of claim 7, wherein the generating module comprises:
   a distributing unit, configured to distribute a number to each of counter pulses in the counter signal; and
   a setting unit, connected with distributing unit, and configured to set the number of the counter pulse corresponding to the comparing signal as the location information of the pixel unit corresponding to the reset sampling signal value less than the predetermined sampling signal threshold.

10. The apparatus of claim 8, wherein a number of counter pulses in the counter signal is equal to that of the pixel units in one row of the pixel array.

11. The apparatus of claim 7, further comprising:
   a storing module, configured to store the location information of the pixel unit corresponding to the reset sampling signal value less than the predetermined sampling signal threshold.

12. The apparatus of claim 7, wherein the image sensor is a complementary metal oxide semiconductor CMOS image sensor.

13. An image sensor, comprising:
   a plurality of pixel units,
   an apparatus for removing a sunspot of the image sensor according to claim 7,
   wherein the apparatus is electrically connected to outputs of the pixel units.

* * * * *